(12) United States Patent
Fujikawa et al.

(10) Patent No.: US 8,389,153 B2
(45) Date of Patent: Mar. 5, 2013

(54) BATTERY

(75) Inventors: Masato Fujikawa, Osaka (JP);
Tomohiko Yokoyama, Osaka (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 12/681,709

(22) PCT Filed: Jun. 1, 2009

(86) PCT No.: PCT/JP2009/002424
§ 371 (c)(1),
(2), (4) Date: Apr. 5, 2010

(87) PCT Pub. No.: WO2009/150791
PCT Pub. Date: Dec. 17, 2009

(65) Prior Publication Data
US 2010/0227217 A1 Sep. 9, 2010

(30) Foreign Application Priority Data

Jun. 9, 2008 (JP) ................................. 2008-150946
Jun. 9, 2008 (JP) ................................. 2008-150947

(51) Int. Cl.
*H01M 2/08* (2006.01)
*H01M 2/02* (2006.01)
(52) U.S. Cl. ......... 429/174; 429/171; 429/181; 429/185
(58) Field of Classification Search .................... 429/57, 429/139, 171–174, 180, 181, 184, 185
See application file for complete search history.

(56) References Cited

U.S. PATENT DOCUMENTS

| | | | | |
|---|---|---|---|---|
| 6,255,016 B1 * | 7/2001 | Kim | ............................... | 429/174 |
| 7,544,440 B2 * | 6/2009 | Cheon et al. | ................... | 429/163 |
| 2008/0102356 A1 | 5/2008 | Choi | | |

FOREIGN PATENT DOCUMENTS

| | | | |
|---|---|---|---|
| JP | 56018364 A | * | 2/1981 |
| JP | 57034650 A | * | 2/1982 |
| JP | 57072261 A | * | 5/1982 |
| JP | 64-13665 | | 1/1989 |

(Continued)

OTHER PUBLICATIONS

Korean Office Action issued in Korean Patent Application No. KR 10-2010-7006674 dated Jul. 29, 2011.

*Primary Examiner* — Carlos Barcena
(74) *Attorney, Agent, or Firm* — McDermott Will & Emery LLP

(57) ABSTRACT

A battery including: a battery case having a bottom, a side wall, and an upper opening; an electrode assembly; an electrolyte; and a sealing plate covering the upper opening of the battery case accommodating the electrode assembly and the electrolyte, the electrode assembly including a positive electrode, a negative electrode, and a separator interposed between the positive electrode and the negative electrode, a gasket is interposed between an opening-edge portion of the battery case and the sealing plate, a first resistive layer is disposed between the opening-edge portion of the battery case and the gasket, or a second resistive layer is disposed between the sealing plate and the gasket. The first or second resistive layer contains a mixture of a particulate inorganic oxide and a binder. This configuration makes it possible to prevent a short circuit between the battery case and the sealing plate even when the gasket is broken.

8 Claims, 8 Drawing Sheets

FOREIGN PATENT DOCUMENTS

| | | |
|---|---|---|
| JP | 07-220759 | 8/1995 |
| JP | 11-273738 | 10/1999 |
| JP | 2003-151516 | 5/2003 |
| JP | 2003151516 A * | 5/2003 |
| JP | 2004-241353 | 8/2004 |
| JP | 2005-71710 | 3/2005 |
| JP | 2005071710 A * | 3/2005 |
| JP | 2007-242602 | 9/2007 |
| JP | 2008-112723 | 5/2008 |
| JP | 2008159355 A * | 7/2008 |

* cited by examiner

F I G. 7
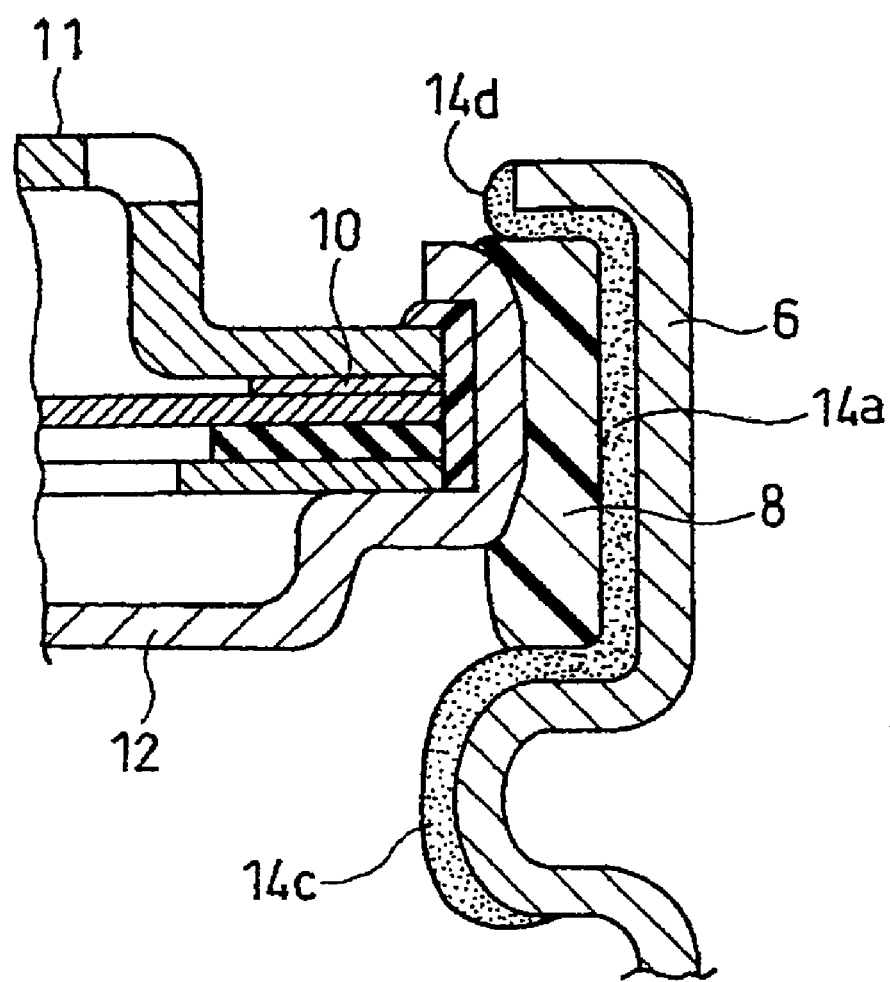

BATTERY

RELATED APPLICATIONS

This application is the U.S. National Phase under 35 U.S.C. §371 of International Application No. PCT/JP2009/002424, filed on Jun. 1, 2009, which in turn claims the benefit of Japanese Application Nos. 2008-150946 and 2008-150947, both were filed on Jun. 9, 2008, the disclosures of which Applications are incorporated by reference herein.

TECHNICAL FIELD

The present invention relates to a structure of batteries, and particularly relates to an improvement of a structure of batteries for preventing short circuit.

BACKGROUND ART

Cylindrical, prismatic or coin batteries each include a battery case made of metal or the like, an electrode assembly and an electrolyte accommodated in the battery case, the battery case being sealed at its opening with a sealing plate. The positive electrode and the negative electrode are wound or stacked with a separator interposed therebetween, forming an electrode assembly. The separator provides electrical insulation between the positive electrode and the negative electrode, and retains an electrolyte.

In cylindrical or coin batteries, the sealing plate has a polarity different from the polarity of the battery case. Because of this, a resin gasket is interposed between the sealing plate and the opening-edge portion of the battery case, providing sealing of the battery case as well as insulation between the sealing plate and the battery case.

In prismatic batteries, the sealing plate has the same polarity as the polarity of the battery case. The sealing plate has a through hole at the center thereof, and into the through hole, a terminal member having a polarity different from the polarity of the battery case is inserted. A gasket is interposed between the sealing plate and the terminal member, providing insulation between the sealing plate and the terminal member.

In the event when an internal short circuit or external short circuit occurs, and a short circuit current is caused to flow to generate Joule heat in a battery, the battery will generate heat and may become overheated. In particular, with respect to lithium ion secondary batteries, because of their high energy densities, it is highly necessary to prevent overheating and increase the degree of safety. For this reason, various structures for preventing short circuit have been proposed.

In order to prevent an external short circuit, for example, one proposal suggests incorporating a PTC (Positive Temperature Coefficient) element, a thermal fuse or the like, which acts as a fail-safe device, in a battery or a circuit for battery-powered equipment. When an excessive amount of current flows due to short-circuiting between external terminals, and the battery temperature is elevated, the PTC element or thermal fuse is activated, to interrupt the current.

In order to prevent an internal short circuit, one proposal suggests forming an electrically insulating layer with thermal resistance between the positive electrode and the negative electrode (Patent Literature 1).

Further, as a method of preventing a short circuit between the battery case and the internal power generation element from occurring in the battery case, forming an electrically insulating layer in a portion of the inner surface of the battery case facing the electrode assembly is proposed (Patent Literatures 2 and 3).

CITATION LIST

Patent Literature

PTL 1: Japanese Laid-Open Patent Publication No. Hei 7-220759
PTL 2: Japanese Laid-Open Patent Publication No. Hei 11-273738
PTL 3: Japanese Laid-Open Patent Publication No. 2007-242602

SUMMARY OF INVENTION

Technical Problem

However, if the sealing plate is broken due to the inclusion of foreign matters, dropping of the battery, impact from outside, and other reasons, the insulation between the sealing plate and the battery case in a cylindrical battery or between the terminal member and the sealing plate in a prismatic battery may become insufficient, which may cause a short circuit. The batteries disclosed in Patent Literatures 1 to 3 are intended to prevent a short circuit between the electrode assembly and the battery case, and cannot prevent a short circuit resulted from breakage of the gasket. When such a short circuit occurs, an excessive amount of current continues to flow without passing through the fail-safe device such as a PTC element, which may eventually cause the battery to be overheated.

In view of the above, the present invention intends to prevent, even when the gasket is broken, the occurrence of a short circuit between the battery case and the sealing plate or between the sealing plate and the terminal member and thus to provide a battery having both an excellent safety and a high capacity.

Solution to Problem

One embodiment of the battery (Battery X) of the present invention includes: a battery case having a bottom, a side wall, and an upper opening; an electrode assembly; an electrolyte; and a sealing plate covering the upper opening of the battery case accommodating the electrode assembly and the electrolyte, the electrode assembly including a positive electrode, a negative electrode, and a separator interposed between the positive electrode and the negative electrode; wherein a gasket is interposed between an opening-edge portion of the battery case and the sealing plate, and a first highly-resistive layer is disposed between the opening-edge portion of the battery case and the gasket, or a second highly-resistive layer is disposed between the sealing plate and the gasket.

In the configuration as described above, even when the gasket becomes thinner due to the inclusion of foreign matters and the other reasons or even when the gasket is broken, the highly-resistive layer can prevent a short circuit between the battery case and the sealing plate.

In Battery X, both the first highly-resistive layer and the second highly-resistive layer may be provided.

In Battery X, the first highly-resistive layer is preferably disposed on an entire area where the opening-edge portion of the battery case and the gasket face to each other, and the second highly-resistive layer is preferably disposed on an entire area where the sealing plate and the gasket face to each other.

It is preferable that the battery case has a step depressed inwardly being formed between the opening-edge portion and the side wall facing the electrode assembly, and a third highly-resistive layer is disposed on a convex surface of the step.

It is preferable that a fourth highly-resistive layer is disposed on an end of the opening-edge portion of the battery case.

Another embodiment of the battery (Battery Y) of the present invention includes: a battery case having a bottom, a side wall, and an upper opening; an electrode assembly; an electrolyte; and a sealing plate covering the upper opening of the battery case accommodating the electrode assembly and the electrolyte, the electrode assembly including a positive electrode, a negative electrode, and a separator interposed between the positive electrode and the negative electrode, the sealing plate having a shape conforming to an opening-edge portion of the battery case and having a through hole at the center thereof, wherein a terminal member is inserted into the through hole, a gasket is interposed between the sealing plate and the terminal member, and a first highly-resistive layer is disposed between the sealing plate and the gasket, or a second highly-resistive layer is disposed between the terminal member and the gasket.

In Battery Y, both the first highly-resistive layer and the second highly-resistive layer may be provided.

In Battery Y, the first highly-resistive layer is preferably disposed on an entire area where the sealing plate and the gasket face to each other, and the second highly-resistive layer is preferably disposed on an entire area where the terminal member and the gasket face to each other.

Battery Y further includes a connector plate being connected to the terminal member on the inner surface side of the sealing plate, and an inner insulating member for insulating the sealing plate from the connector plate, wherein a third highly-resistive layer is disposed between the sealing plate and the inner insulating member.

In Battery X, at least one selected from the group consisting of the first highly-resistive layer, the second highly-resistive, the third highly-resistive layer, and the fourth highly-resistive is preferably an electrically insulating layer.

In Battery Y, at least one selected from the group consisting of the first highly-resistive layer, the second highly-resistive, and the third highly-resistive layer is preferably an electrically insulating layer.

In Batteries X and Y, the first highly-resistive layer or the second highly-resistive layer preferably has a thickness of 1 μm or more and 100 μm or less.

In Batteries X and Y, the first highly-resistive layer or the second highly-resistive layer preferably contains at least one selected from the group consisting of epoxy resin, polyamide resin, polyolefin resin, polyimide resin, polyvinyl resin, silicone resin, and fluorocarbon resin.

In Batteries X and Y, the first highly-resistive layer or the second highly-resistive layer preferably contains a mixture of a particulate inorganic oxide and a binder.

Batteries X and Y are preferably lithium ion secondary batteries.

Advantageous Effects of Invention

According to the present invention, it is possible to prevent a short circuit between the battery case and the sealing plate or between the sealing plate and the terminal member even when the gasket is broken, and therefore to provide a battery having both an excellent safety and a high capacity.

BRIEF DESCRIPTION OF DRAWINGS

FIG. 7 is an enlarged view of a main part of the cylindrical lithium ion secondary battery of FIG. 6;

DESCRIPTION OF EMBODIMENTS (i) First Embodiment

A battery according to this embodiment includes: a battery case having a bottom, a side wall, and an upper opening; an electrode assembly; an electrolyte; a sealing plate covering the upper opening of the battery case accommodating the electrode assembly and the electrolyte. The electrode assembly includes a positive electrode, a negative electrode, and a separator interposed between the positive electrode and the negative electrode. A gasket is interposed between the opening-edge portion of the battery case and the sealing plate. The battery of this embodiment has a first highly-resistive layer disposed between the opening-edge portion of the battery case and the gasket. By configuring as described above, it is possible to prevent a short circuit between the battery case and the sealing plate by virtue of the first highly-resistive layer when the gasket becomes thinner due to the inclusion of foreign matters and the like or even when the gasket is broken, and therefore to provide a battery having an excellent safety. This embodiment is particularly suitable for cylindrical or coin batteries, but also applicable to prismatic batteries.

Figure 1:
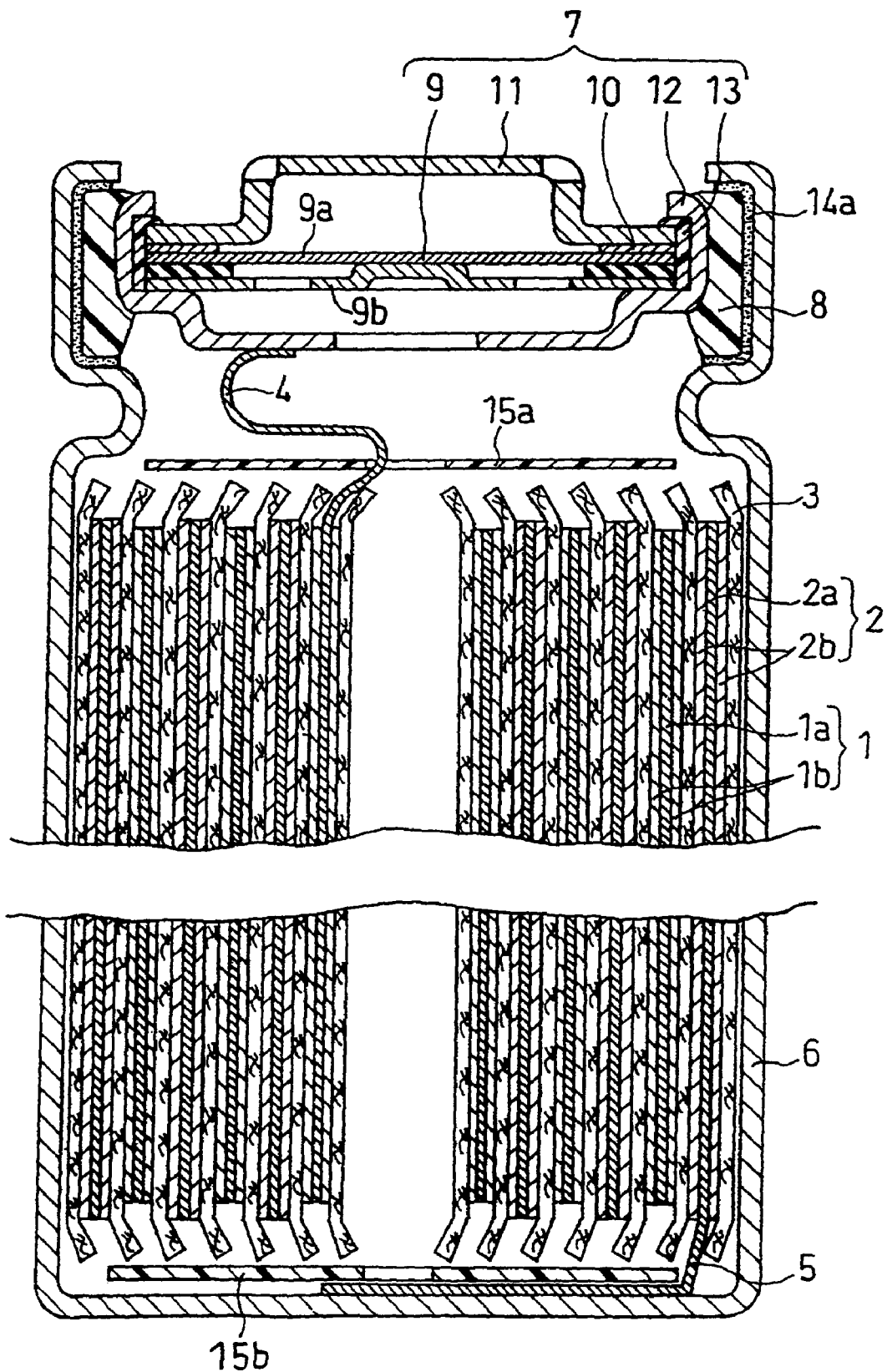
FIG. 1 is a longitudinal cross-sectional view schematically showing a cylindrical lithium ion secondary battery according to a first embodiment of the present invention.
Figure 2:
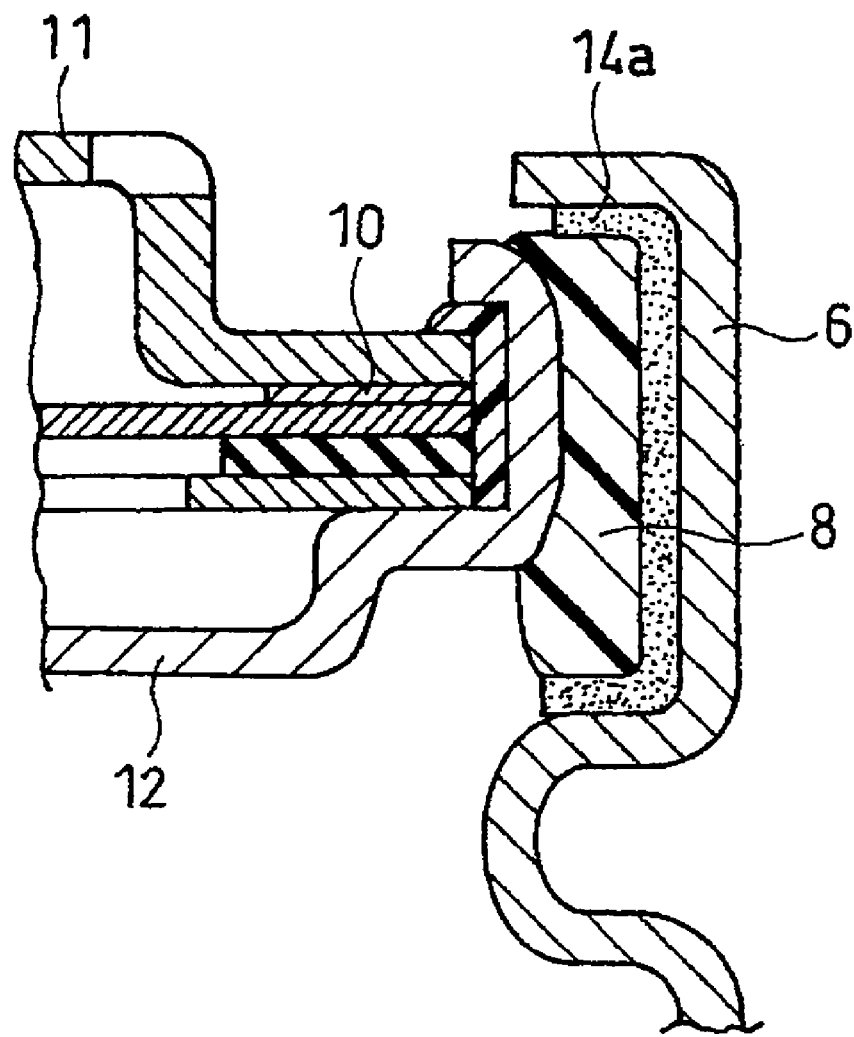
FIG. 2 is an enlarged view of a main part of the cylindrical lithium ion secondary battery of FIG. 1.

FIG. 1 is a longitudinal cross-sectional view schematically showing a cylindrical lithium ion secondary battery according to this embodiment. FIG. 2 is an enlarged view of a main part of the battery of FIG. 1.

A battery case 6 has a bottom, a side wall, and an upper opening. In the interior of the battery case 6, an electrode assembly sandwiched by an upper insulating plate 15a and a lower insulating plate 15b, and a non-aqueous electrolyte (not shown) are accommodated. The upper opening of the battery case 6 is sealed with a sealing plate 7, and a gasket 8 is disposed between the opening-edge portion of the battery case 6 and the sealing plate 7.

The electrode assembly is configured by winding a first electrode 1 and a second electrode 2 with a separator 3 interposed therebetween. One of the first and second electrodes 1 and 2 serves as a positive electrode; and the other serves as a negative electrode. To the first electrode 1, one end of a first electrode lead 4 is connected; and to the second electrode 2, one end of a second electrode lead 5 is connected. The other end of the second electrode lead 5 is welded to the battery case 6 at the bottom of the electrode assembly. The other end of the first electrode lead 4 is connected to the undersurface of the sealing plate 7.

The sealing plate 7 includes a valve member 9 consisting of an upper valve member 9a and a lower valve member 9b, a PTC element 10, a terminal cap 11, a filter 12, and an inner insulating member 13. The upper valve member 9a made of a thin metallic foil breaks when the internal pressure in the battery case exceeds a predetermined value. Upon the breakage of the valve member, the gas in the battery is released outside through apertures of the terminal cap 11 and the current is interrupted. The PTC element 10 is disposed between the terminal cap 11 and the valve member 9. The PTC element 10 is activated when an excessive amount of current flows and the temperature is increased, to interrupt the current. The filter 12 is attached to the valve member 9 in the electrode assembly side thereof. Between the terminal cap 11 and the filter 12, the PTC element 10 is disposed; and between the filter 12 and the terminal cap 11, the inner insulating member 13 is disposed to provide insulation therebetween. As such, the current supplied from the first electrode terminal (the terminal cap 11) passes through the PTC element 10 without fail, making it possible to more reliably interrupt the current in the event of abnormality.

In FIG. 1, a first highly-resistive layer 14a is formed between the opening-edge portion of the battery case 6 and the gasket 8. As such, even when the gasket 8 is broken, the battery case 6 and the sealing plate 7 are kept insulated by virtue of the first highly-resistive layer 14a. Here, it is preferable that the first highly-resistive layer 14a is disposed on an entire area where the opening-edge portion of the battery case 6 and the gasket 8 face to each other. This improves the effect of preventing short circuit, making it possible to provide a battery having a more excellent safety.

The first highly-resistive layer preferably has a high adhesion strength with respect to the battery case so that the first highly-resistive layer is not cracked or separated in the process of providing the battery case with a step for fixing the sealing plate, clamping, and other processes.

In this embodiment, the first highly-resistive layer may be formed on the inner surface of the opening-edge portion of the battery case or on the surface of the gasket. Among these, the first highly-resistive layer is preferably formed on the inner surface of the opening-edge portion of the battery case. When the first highly-resistive layer is formed on the inner surface of the opening-edge portion of the battery case, even if the gasket is broken, the first highly-resistive layer is unlikely to be broken together with the gasket. Accordingly, short circuit can be more reliably prevented.

A method of forming the first highly-resistive layer is not particularly limited. Examples of the method include a method of applying a paste serving as a precursor of the first highly-resistive layer to the opening-edge portion of the battery case or the gasket and drying the paste, sputtering or vapor depositing an inorganic oxide with insulating property thereon, and a method of electrodepositing the first highly-resistive layer on the opening-edge portion of the battery case.

A cylindrical lithium ion secondary battery is fabricated, for example, in the following manner.

The electrode assembly is sandwiched between the upper insulating plate and the lower insulating plate, and then accommodated in the battery case. The other end of the first electrode lead is connected to the bottom surface of the sealing plate. The other end of the second electrode lead is connected to the inner bottom surface of the battery case. After the battery case is provided with a step for fixing the sealing plate by clamping, a non-aqueous electrolyte is injected into the battery case. The opening-edge portion of the battery case is clamped onto the sealing plate with the gasket interposed therebetween, whereby a cylindrical lithium ion secondary battery is fabricated.

(ii) Second Embodiment

A battery according to this embodiment does not have the first highly-resistive layer disposed between the opening-edge portion of the battery case and the gasket and has a second highly-resistive layer disposed between the sealing plate and the gasket. By configuring as described above, it is possible to prevent a short circuit between the sealing plate and the battery case by virtue of the second highly-resistive layer even when the gasket is broken, and therefore to provide a battery having an excellent safety. The battery according to this embodiment basically has the same configuration as the battery according to the above-described first embodiment except the above, and the detailed description thereof is omitted. This embodiment is particularly suitable for cylindrical or coin batteries, but also applicable to prismatic batteries.

Figure 3:
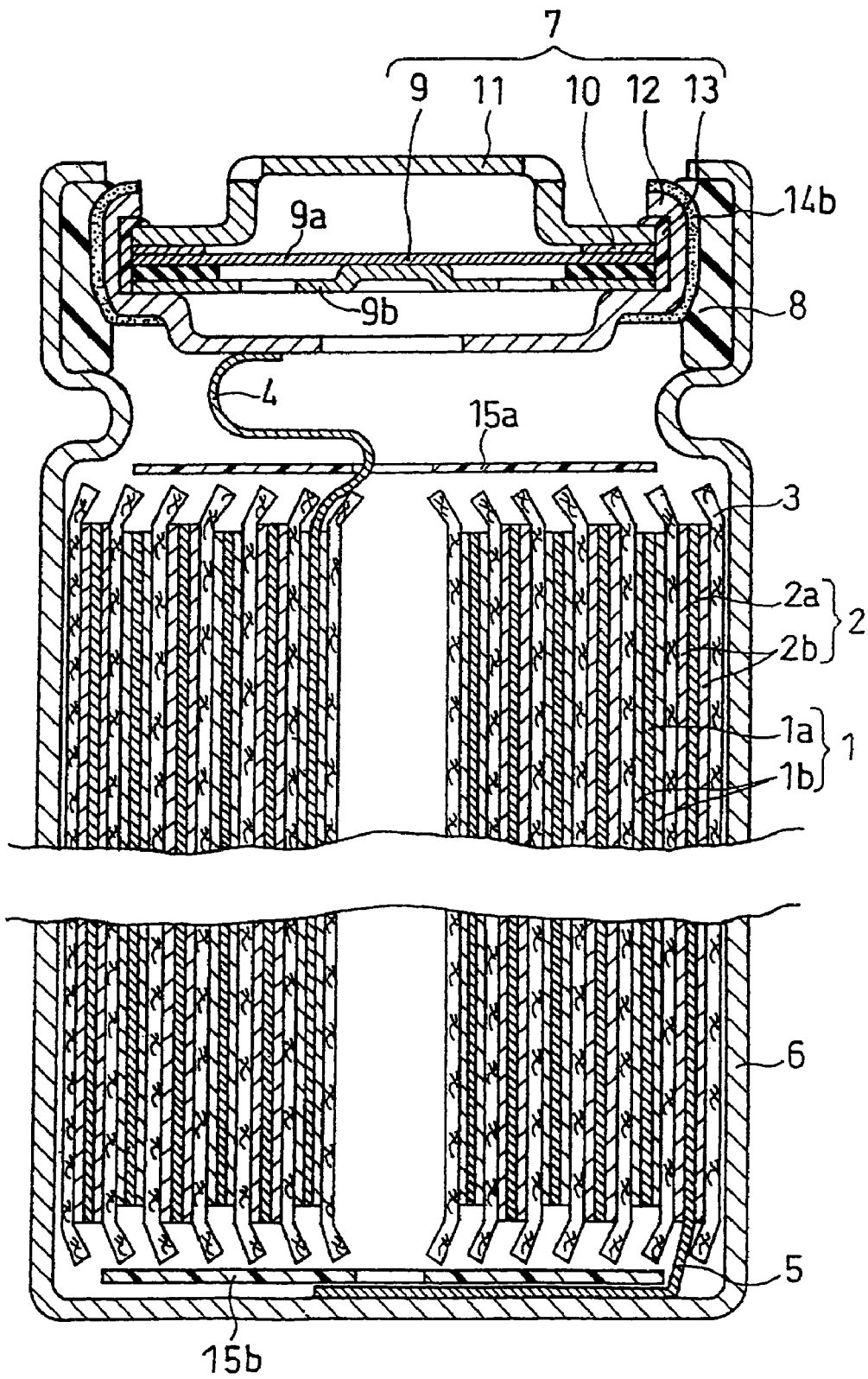
FIG. 3 is a longitudinal cross-sectional view schematically showing a cylindrical lithium ion secondary battery according to a second embodiment of the present invention.
Figure 4:
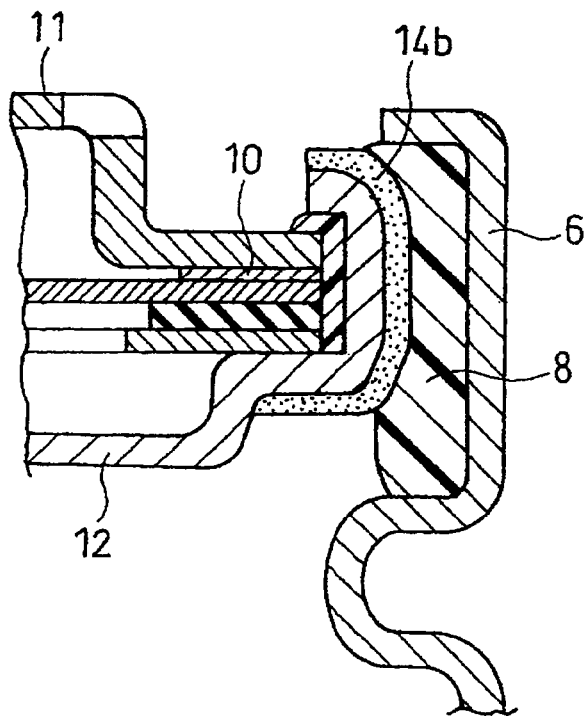
FIG. 4 is an enlarged view of a main part of the cylindrical lithium ion secondary battery of FIG. 3.

FIG. 3 is a longitudinal cross-sectional view schematically showing a cylindrical lithium ion secondary battery according to this embodiment. FIG. 4 is an enlarged view of a main part of the battery of FIG. 3.

In FIG. 3, a second highly-resistive layer 14b is formed between the sealing plate 7 and the gasket 8. As such, even when the gasket 8 is broken, the battery case 6 and the sealing plate 7 are kept insulated by virtue of the second highly-resistive layer 14b. Here, it is preferable that the second highly-resistive layer 14b is disposed on an entire area where the sealing plate 7 and the gasket 8 face to each other. This improves the effect of preventing short circuit, making it possible to provide a battery having a more excellent safety.

In this embodiment, as the second highly-resistive layer, for example, the same highly-resistive layer as the first highly-resistive layer may be used.

In this embodiment, the second highly-resistive layer may be formed on the surface of the sealing plate or on the surface of the gasket. Among these, the second highly-resistive layer is preferably formed on the surface of the sealing plate, for example, on the outer periphery of the filter 12 as shown in FIG. 3 and FIG. 4. When the second highly-resistive layer is formed on the sealing plate, even if the gasket is broken, the second highly-resistive layer is unlikely to be broken together with the gasket. Accordingly, short circuit can be more reliably prevented.

A method of forming the second highly-resistive layer is not particularly limited. Examples of the method include a method of applying a paste serving as a precursor of the second highly-resistive layer to the sealing plate or the gasket and drying the paste, sputtering or vapor depositing a particulate inorganic oxide with insulating property thereon, and a method of electrodepositing the second highly-resistive layer on the sealing plate.

(iii) Third Embodiment

Figure 5:
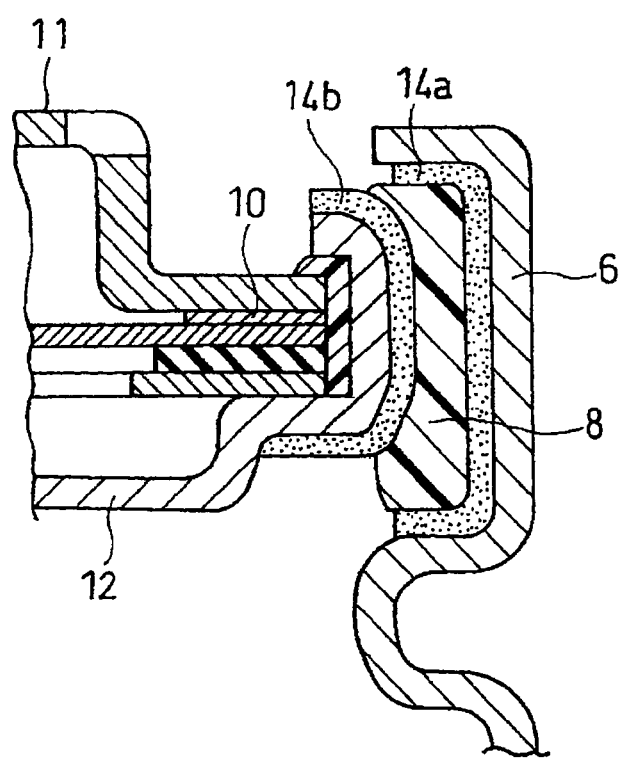
FIG. 5 is an enlarged view of a main part of a cylindrical lithium ion secondary battery having both a first highly-resistive layer and a second highly-resistive layer.

A battery according to this embodiment has both the first highly-resistive layer and the second highly-resistive layer. FIG. 5 is an enlarged view of a main part of a cylindrical lithium ion secondary battery according to this embodiment. The battery shown in FIG. 5 has the first highly-resistive layer 14a between the opening-edge portion of the battery case 6 and the gasket 8 and the second highly-resistive layer 14b between the sealing plate 7 and the gasket 8.

By providing both the first highly-resistive layer and the second highly-resistive layer, short circuit can be more reliably prevented, and a battery having a more excellent safety can be provided. Here, it is preferable that the first highly-resistive layer is disposed on an entire area where the battery case and the gasket face to each other, and the second highly-resistive layer is disposed on an entire area where the sealing plate and the gasket face to each other. This improves the effect of preventing short circuit, making it possible to provide a battery having a more excellent safety. The battery according to this embodiment basically has the same configuration as the battery according to the above-described first embodiment except that both the first highly-resistive layer and the second highly-resistive layer are provided, and the detailed description thereof is omitted.

In this embodiment, it is preferable that the first highly-resistive layer is formed on the opening-edge portion of the battery case, and the second highly-resistive layer is formed on the sealing plate. It is further preferable that the first highly-resistive layer and the second highly-resistive layer are both electrically insulating layers.

(iv) Fourth Embodiment

A battery according to this embodiment has the first highly-resistive layer or the second highly-resistive layer, and further has at least one of a third highly-resistive layer and a fourth highly-resistive layer.

Figure 6:
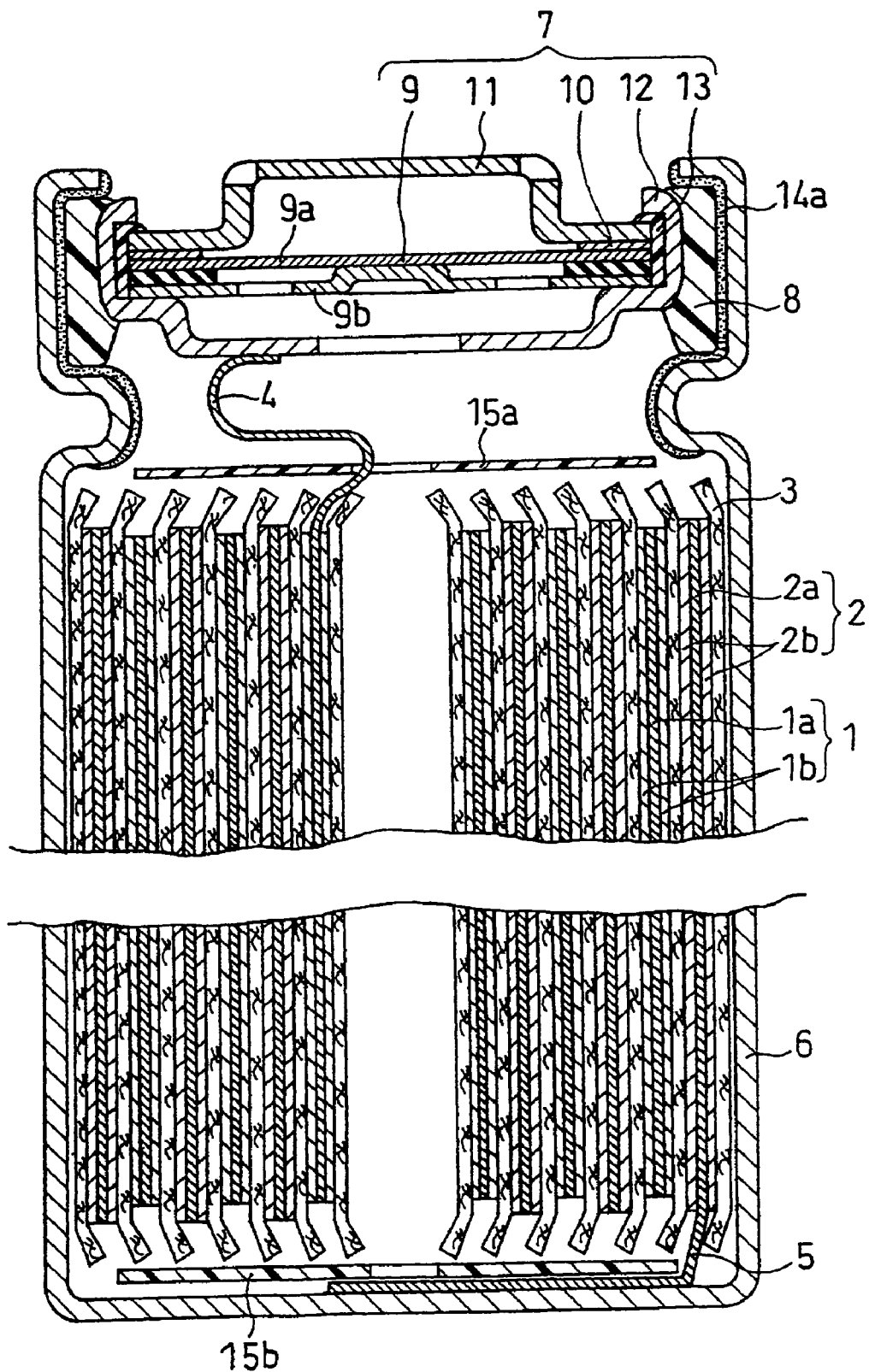
FIG. 6 is a longitudinal cross-sectional view schematically showing a cylindrical lithium ion secondary battery having both a third highly-resistive layer and a fourth highly-resistive layer.

FIG. 6 is a longitudinal cross-sectional view schematically showing a cylindrical lithium ion secondary battery having both a third highly-resistive layer and a fourth highly-resistive layer. FIG. 7 is an enlarged view of a main part of the battery of FIG. 6. The battery shown in FIGS. 6 and 7 includes a step depressed inwardly being disposed between the opening-edge portion and the side wall facing the electrode assembly, in which a third highly-resistive layer 14c is disposed on a convex surface of the step, and a fourth highly-resistive layer 14d is disposed on an end of the opening-edge portion. The battery according to this embodiment basically has the same configuration as the batteries according to the above-described first to third embodiments except that at least either one of the third highly-resistive layer and the fourth highly-resistive layer is provided, and the detailed description thereof is omitted.

The battery according to the present embodiment includes a step depressed inwardly being formed between the opening-edge portion and the side wall facing the electrode assembly, and a third highly-resistive layer is disposed on a convex surface of the step. By configuring as described above, even if the first electrode lead is folded to be brought into contact with the convex surface of the step of the battery case, it is possible to prevent a short circuit between the battery case and the first electrode lead.

The end of the opening-edge portion of the battery case is clamped onto the sealing plate with the gasket interposed therebetween. Because of this, it is most likely that short circuit occurs at the end of the opening-edge portion. In view of this, in this embodiment, a fourth highly-resistive layer is disposed on the end of the opening-edge portion. By configuring as described above, it is possible to prevent a short circuit between the battery case and the sealing plate by virtue of the highly-resistive layer even when the gasket becomes thinner due to the inclusion of foreign matters and other reasons or even when the gasket is broken.

The third highly-resistive layer and the fourth highly-resistive layer may be formed individually, or alternatively may be formed integrally with the first highly-resistive layer. Among these, in view of simplifying the production process, it is preferable to form integrally with the first highly-resistive layer. The battery of FIG. 6 has both the third highly-resistive layer 14c and the fourth highly-resistive layer 14d, but only either one of these may be formed.

A method of forming the third highly-resistive layer and the fourth highly-resistive layer is not particularly limited. Examples of the method include a method of applying a paste serving as a precursor of the third highly-resistive layer or the fourth highly-resistive layer to a predetermined position of the battery case and drying the paste, sputtering or vapor depositing an inorganic oxide with insulating property thereon, and a method of electrodepositing the third highly-resistive layer or the fourth highly-resistive layer on a predetermined position of the battery case.

(v) Fifth Embodiment

A battery according to this embodiment includes: a battery case having a bottom, a side wall, and an upper opening; an electrode assembly; an electrolyte; and a sealing plate covering the upper opening of the battery case accommodating the electrode assembly and the electrolyte. The electrode assembly including a positive electrode, a negative electrode, and a separator interposed between the positive electrode and the negative electrode. The sealing plate has a shape conforming to the opening-edge portion of the battery case and has a through hole at the center thereof. A terminal member is inserted into the through hole. A gasket is interposed between the sealing plate and the terminal member. The battery of this embodiment has a first highly-resistive layer disposed between the sealing plate and the gasket. By configuring as described above, it is possible to prevent a short circuit between the sealing plate and the terminal member by virtue of the first highly-resistive layer even when the gasket is broken, and therefore to provide a battery having an excellent safety. This embodiment is particularly suitable for prismatic batteries, but also applicable to cylindrical batteries.

Figure 8:
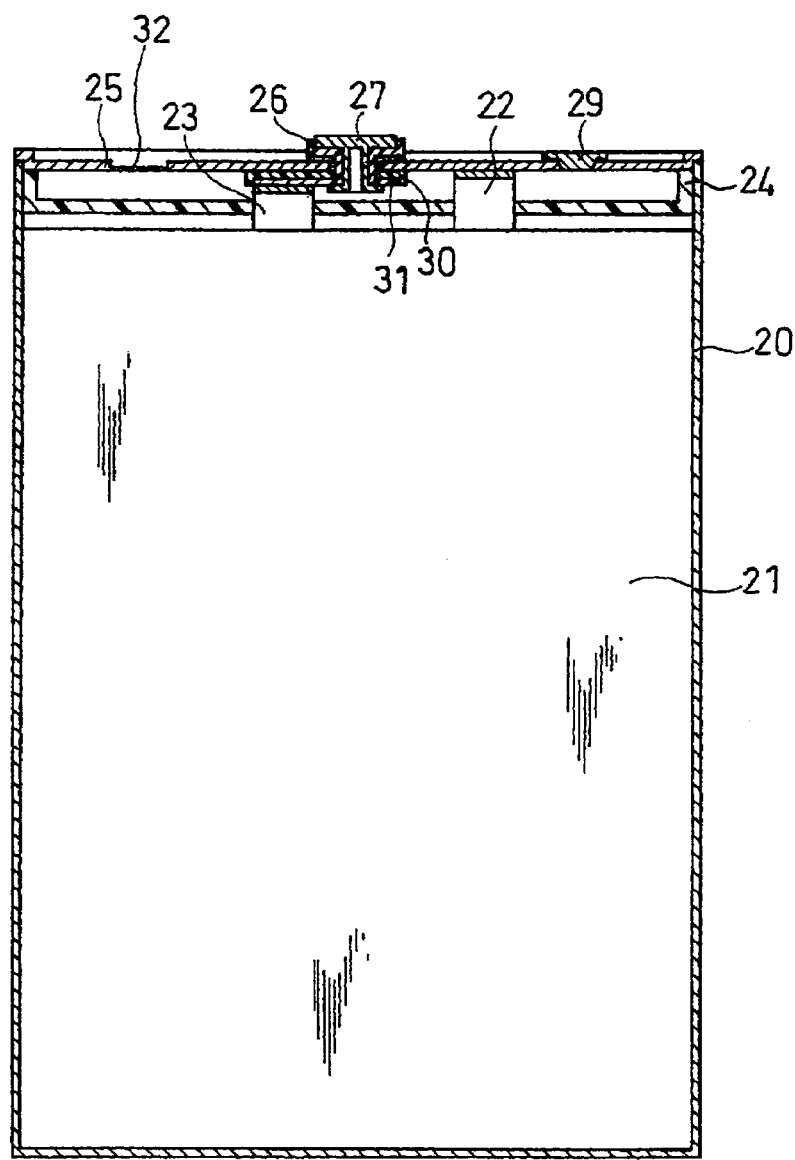
FIG. 8 is a longitudinal cross-sectional view schematically showing one example of a prismatic lithium ion secondary battery.
Figure 9:
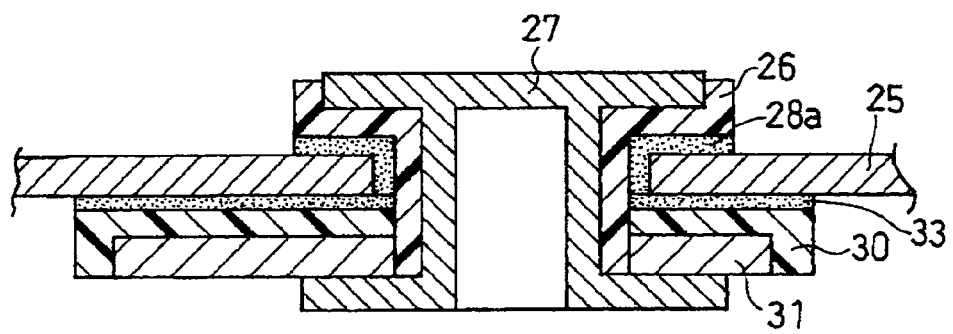
FIG. 9 is an enlarged view of a main part of a prismatic lithium ion secondary battery according to a fifth embodiment of the present invention.

FIG. 8 is a longitudinal cross-sectional view schematically showing one example of a prismatic lithium ion secondary battery. FIG. 9 is an enlarged view of a main part of a prismatic lithium ion secondary battery according to this embodiment.

A battery case 20 has a bottom, a side wall, and an upper opening. The battery case 20 accommodates an electrode assembly 21 and a non-aqueous electrolyte (not shown). The upper opening of the battery case 20 is sealed with a sealing plate 25, and the opening-edge portion and the sealing plate 25 are bonded together by welding.

The sealing plate 25 has a shape conforming to the opening-edge portion of the battery case 20 and having a through hole at the center thereof. A terminal member 27 is inserted into the through hole, and a gasket 26 is interposed between the sealing plate 25 and the terminal member 27. The sealing plate 25 includes a valve member 32 that breaks when the internal pressure in the battery case 20 exceeds a predetermined value. A first highly-resistive layer 28a is present between the hole portion of the sealing plate 25 and the gasket 26. A first electrode lead 22 is connected to the bottom surface of the sealing plate 25, and a second electrode lead 23 is connected to the terminal member 27 through a connector plate 31. A sealing stopper 29 seals an electrolyte injection port. On top of the electrode assembly 21, an insulator 24 for preventing a short circuit between the battery case 20 and the first electrode lead 22 or the second electrode lead 23 is placed. The sealing plate 25 and the connector plate 31 are insulated from each other by an inner insulating member 30.

In this embodiment, as the electrode assembly and the first highly-resistive layer, for example, the same electrode assembly and first highly-resistive layer as those in the first embodiment may be used.

In this embodiment, the first highly-resistive layer may be formed on the sealing plate or on the surface of the gasket. Among these, the first highly-resistive layer is preferably formed on the sealing plate. When the first highly-resistive layer is formed on the sealing plate, even if the gasket is broken, the first highly-resistive layer is unlikely to be broken together with the gasket. Accordingly, short circuit can be more reliably prevented.

By configuring as described above, also in prismatic batteries, it is possible to prevent a short circuit between the sealing plate and the terminal member, and therefore to provide a battery having an excellent safety.

A method of forming the first highly-resistive layer is not particularly limited. Examples of the method include a method of applying a paste serving as a precursor of the first highly-resistive layer to the sealing plate or the gasket and drying the paste, sputtering or vapor depositing an inorganic oxide with insulating property thereon, and a method of electrodepositing the first highly-resistive layer on the sealing plate.

A prismatic lithium ion secondary battery is fabricated, for example, in the following manner.

The terminal member is inserted into the through hole provided in the center of the sealing plate and fixed by clamping with the gasket, inner insulating member, and connector plate interposed therebetween. Here, the first highly-resistive layer is disposed between the sealing plate and the gasket. Thereafter, a first electrode is connected to the bottom surface of the sealing plate, and a second electrode is connected to the connector plate.

The electrode assembly is accommodated into the battery case, and the sealing plate is placed at the opening of the battery case and then welded to the battery case. Subsequently, the electrolyte is injected into the battery case through the electrolyte injection port, and finally, the electrolyte injection port is sealed by the sealing stopper, whereby a prismatic lithium ion secondary battery is fabricated.

(vi) Sixth Embodiment

A battery according to this embodiment does not have the first highly-resistive layer disposed between the sealing plate and the gasket and has a second highly-resistive layer disposed between the terminal member and the gasket. By configuring as described above, it is possible to prevent a short circuit between the sealing plate and the terminal member by virtue of the second highly-resistive layer even when the gasket is broken, and therefore to provide a battery having an excellent safety. The battery according to this embodiment basically has the same configuration as the battery according to the above-described fifth embodiment except the above, and the detailed description thereof is omitted. This embodiment is particularly suitable for prismatic batteries, but also applicable to cylindrical batteries.

Figure 10:
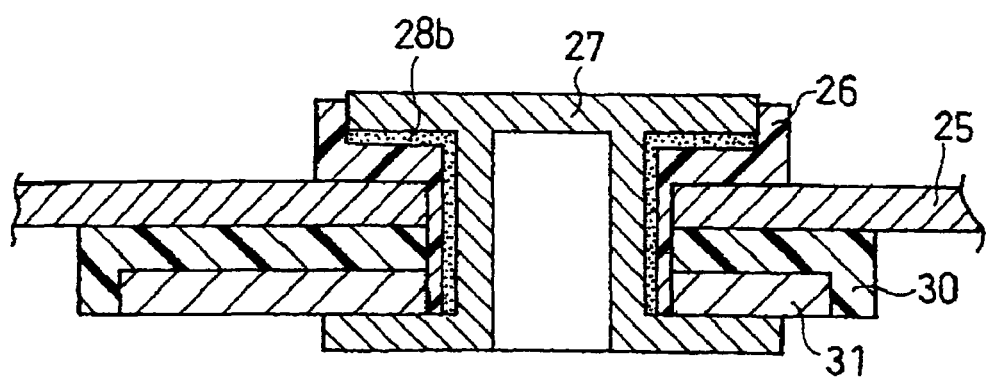
FIG. 10 is an enlarged view of a main part of a prismatic lithium ion secondary battery according to a sixth embodiment of the present invention.

FIG. 10 is an enlarged view of a main part of a prismatic lithium ion secondary battery according to this embodiment.

In FIG. 10, a second highly-resistive layer 28b is formed between the terminal member 27 and the gasket 26. As such, even when the gasket 26 is broken, the sealing plate 25 and the terminal member 27 are kept insulated by virtue of the second highly-resistive layer 28b. Here, it is preferable that the second highly-resistive layer 28b is disposed on an entire area where the terminal member 27 and the gasket 26 face to each other.

In this embodiment, as the second highly-resistive layer, for example, the same highly-resistive layer as the first highly-resistive layer may be used.

In this embodiment, the second highly-resistive layer may be formed on the surface of the terminal member or on the surface of the gasket. Among these, the second highly-resistive layer is preferably formed on the surface of the terminal member. When the second highly-resistive layer is formed on the terminal member, even if the gasket is broken, the second highly-resistive layer is unlikely to be broken together with the gasket. Accordingly, short circuit can be more reliably prevented.

A method of forming the second highly-resistive layer is not particularly limited. Examples of the method include a method of applying a paste serving as a precursor of the second highly-resistive layer to the terminal member or the gasket and drying the paste, sputtering or vapor depositing an inorganic oxide with insulating property thereon, and a method of electrodepositing the second highly-resistive layer on the terminal member.

(vii) Seventh Embodiment

A battery according to this embodiment has both the first highly-resistive layer and the second highly-resistive layer. By configuring as described above, short circuit can be more reliably prevented, and a battery having a more excellent safety can be provided. Here, it is preferable that the first highly-resistive layer is disposed on an entire area where the sealing plate and the gasket face to each other, and the second highly-resistive layer is disposed on an entire area where the terminal member and the gasket face to each other. This improves the effect of preventing short circuit, making it possible to provide a battery having a more excellent safety. The battery according to this embodiment basically has the same configuration as the battery according to the above-described fifth embodiment except that both the first highly-resistive layer and the second highly-resistive layer are provided, and the detailed description thereof is omitted.

It is preferable that the first highly-resistive layer is formed on the sealing plate, and the second highly-resistive layer is formed on the terminal member. It is further preferable that the first highly-resistive layer and the second highly-resistive layer are both electrically insulating layers.

(viii) Eighth Embodiment

A battery according to this embodiment has the first highly-resistive layer or the second highly-resistive layer, and further has a third highly-resistive layer 33 disposed between the sealing plate 25 and the inner insulating member 30 as shown in FIG. 9. By configuring as described above, even when the inner insulating member is damaged, it is possible to prevent a short circuit between the sealing plate and the connector plate. The battery according to this embodiment basically has the same configuration as the batteries according to the above-described fifth to seventh embodiments except that the third highly-resistive layer is provided, and the detailed description thereof is omitted.

Next, the first, second, third, and fourth highly-resistive layers of the present invention are described. The first, second, third, and fourth highly-resistive layers (hereinafter simply also referred to as the "highly-resistive layers") may be the same highly-resistive layer or different highly-resistive layers.

The highly-resistive layer has a resistivity sufficient enough to reduce the current flown into the electrode assembly to be a current value within a permissible range even when a short circuit occurs between the opening-edge portion of the battery case and the sealing plate or between the sealing plate and the terminal member. For example, in the case of a battery having a design capacity of 2600 mAh or more, the battery preferably has a highly-resistive layer having a resistivity of 100 Ω·m or more. More preferably, all of the highly-resistive layers are electrically insulating layers.

Although no particular limitation is imposed thereon, the highly-resistive layer is preferably made of resin materials for the reason that resin materials have sufficient resistivity and are chemically stabile. Examples of the resin materials include epoxy resin, polyamide resin, polyolefin resin, polyimide resin, polyvinyl resin, silicone resin, and fluorocarbon resin. The polyolefin resin is exemplified by polyethylene resin, polypropylene resin, and the like. These resin materials may be used alone or in combination of two or more.

The highly-resistive layer may be made of a mixture of a particulate inorganic oxide and a binder. The particulate inorganic oxide is preferably a particulate inorganic oxide with insulating property, and preferably contains, for example, at least one selected from the group consisting of alumina, magnesia, silica, and titania, and particularly preferably contains alumina. Examples of the binder include polyvinylidene fluoride (PVDF), polytetrafluoroethylene (PTFE), and modified acrylonitrile rubber particles (e.g., "BM-500B (trade name)" available from by Zeon Corporation, Japan).

In the case of using PTFE or modified acrylonitrile rubber particles as the binder, it is preferable to use a thickener in combination therewith. Examples of the thickener include carboxymethylcellulose (CMC), polyethylene oxide (PEO), modified polyacrylonitrile rubber (e.g., "BM-720H (trade name)" available from by Zeon Corporation, Japan).

The inclusion of a particulate inorganic oxide in the highly-resistive layer improves the heat resistance of the highly-resistive layer and thus improves the safety of the battery. The particulate inorganic oxide preferably has an average particle size of, for example, 0.1 to 5 μm. In the mixture of a particulate inorganic oxide and a binder, the content of the binder is preferably 10 to 80% by weight. The highly-resistive layer may not contain a binder.

The highly-resistive layer preferably has a thickness of 1 μm or more and 100 μm or less.

When the highly-resistive layer has a thickness of less than 1 μm, it may become impossible to maintain the insulation in the event of the breakage of the gasket, for example, the insulation between the battery case and the sealing plate. On the other hand, when the highly-resistive layer has a thickness exceeding 100 μm, the ratio of the volume of the highly-resistive layer in the battery is increased, and the energy density of the battery may become insufficient. The highly-resistive layer more preferably has a thickness of 5 μm or more and 50 or less.

The shape of the battery is not limited to a cylindrical or prismatic shape, and may be, for example, a coin shape. In the present invention, the bottom of the battery may have the same structure as the upper opening thereof, and for example, may have a structure in which the opening-edge portion is sealed with a gasket and a sealing plate. The battery may be a large-sized battery for use in electric vehicles and the like.

The electrode assembly included in the battery of the present invention may be a wound electrode assembly or a stacked electrode assembly.

In present invention, there is no particular limitation on the positive electrode, the negative electrode, the separator, and the electrolyte.

The positive electrode includes a positive electrode current collector and a positive electrode active material layer. The positive electrode active material layer includes a positive electrode active material as an essential component, and a conductive agent, a binder, and the like as an optional component. The positive electrode active material preferably includes, for example, a lithium-containing composite oxide represented by the general formula: $Li_xM_yO_2$, where M is Co, Ni, Mn, etc. The lithium-containing composite oxide is exemplified by $LiCoO_2$, $LiNiO_2$, $Li_2MnO_4$, and the like. The positive electrode active material may include an olivine-type lithium phosphate represented by the general formula: $LiMPO_4$, where M is at least one selected from the group consisting of V, Fe, Ni and Mn; lithium fluorophosphate represented by the general formula: $Li_2MPO_4F$, where M is at least one selected from the group consisting of V, Fe, Ni and Mn; and the like. Some of the constituent elements of these lithium-containing compounds may be substituted by a different element. The positive electrode active material may be subjected to surface treatment with a metal oxide, lithium oxide, conductive agent, and the like, or may be subjected to surface water-repellent treatment. These positive electrode active materials may be used alone or in combination of two or more.

Examples of the conductive agent include carbon materials such as graphites exemplified by natural graphite and artificial graphite, carbon blacks exemplified by acetylene black, Ketjen black, furnace black, lamp black, and thermal black; conductive fibers such as carbon fiber and metal fiber; fluorocarbon; metal powders such aluminum powder; conductive whiskers such as zinc oxide and potassium titanate; conductive metal oxides such as titanium oxide; and organic conductive materials such as a phenylene derivative. These conductive agents may be used alone or in combination of two or more.

Examples of the binder include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, polyhexafluoropropylene, styrene-butadiene rubber, and carboxymethyl cellulose. Alternative examples of the binder include a copolymer containing at least two selected from the group consisting of tetrafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene. These binders may be used alone or in combination of two or more.

Although no particular limitation is imposed thereon, the positive electrode current collector is preferably made of aluminum (Al), carbon, conductive resin, or the like. The positive electrode current collector may be subjected to surface treatment with carbon or the like.

The negative electrode includes a negative electrode current collector and a negative electrode active material layer. The negative electrode active material layer includes a negative electrode active material as an essential component, and a binder and the like as an optional component. Examples of the negative electrode active material include a carbon material such as graphite; and a metal capable of charging and discharging lithium ions such as silicon and tin, and an alloy or compound of these metals. These negative electrode active materials may be used alone or in combination of two or more.

The binder for a negative electrode is not particularly limited, and may be, for example, the binder as listed above as the binder for a positive electrode.

The negative electrode current collector also is not particularly limited, and may be, for example, a metallic foil such as a stainless steel foil, a nickel foil, a copper foil, and a titanium foil; and a thin film such as a carbon film and a conductive resin film. The negative electrode current collector may be subjected to surface treatment with carbon, nickel, titanium or the like.

The non-aqueous electrolyte may be a liquid non-aqueous electrolyte containing a non-aqueous solvent and a solute dissolved in the non-aqueous solvent, a polymer electrolyte containing a liquid non-aqueous electrolyte and a polymer compound, or the like.

The solute is not particularly limited, and for example, may be selected appropriately with the oxidation-reduction potential being taken into consideration. Preferable examples of the solute include $LiPF_6$, $LiBF_4$, $LiClO_4$, $LiAlCl_4$, $LiSbF_6$, LiSCN, $LiCF_3SO_3$, $LiNCF_3CO_2$, $LiAsF_6$, lithium lower aliphatic carboxylate, LiF, LiCl, LiBr, LiI, chloroborane lithium, borates such as lithium bis(1,2-benzendiolate(2-)-O, O') borate, lithium bis(2,3-naphthalenediolate(2-)-O,O') borate, lithium bis(2,2'-biphenyldiolate(2-)-O,O') borate, and lithium bis(5-fluoro-2-olate-1-benzenesulfonate-O,O') borate, $LiN(CF_3SO_2)_2$, $LiN(CF_3SO_2)$ $(C_4F_9SO_2)$, $LiN(C_2F_5SO_2)_2$, and lithium tetraphenylborate. These solutes may be used alone or in combination of two or more.

The non-aqueous solvent also is not particularly limited. Examples of the non-aqueous solvent include ethylene carbonate (EC), propylene carbonate, butylene carbonate, vinylene carbonate, dimethyl carbonate (DMC), diethyl carbonate, ethyl methyl carbonate (EMC), dipropyl carbonate, methyl formate, methyl acetate, methyl propionate, ethyl propionate, dimethoxymethane, γ-butyrolactone, γ-valerolactone, 1,2-diethoxy ethane, 1,2-dimethoxyethane, ethoxy methoxy ethane, trimethoxy methane, tetrahydrofuran, a tetrahydrofuran derivative such as 2-methyltetrahydrofuran, dimethylsulfoxide, a dioxolane derivative such as 1,3-dioxolane and 4-methyl-1,3-dioxolane, formamide, acetamide, dimethylfoimamide, acetonitrile, propylnitrile, nitromethane, ethyl monoglyme, phosphoric acid triester, acetic acid ester, propionic acid ester, sulfolane, 3-methylsulfolane, 1,3-dimethyl-2-imidazolidinone, 3-methyl-2-oxazolidinone, a propylene carbonate derivative, ethyl ether, diethyl ether, 1,3-propanesultone, anisole, and fluorobenzene. These non-aqueous solvents may be used only or in combination of two or more.

The non-aqueous electrolyte may include an additive. Examples of the additive include, without any particular limitation, vinylene carbonate, cyclohexylbenzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfite, propane sultone, trifluoropropylene carbonate, dibenzofuran, 2,4-difluoroanisole, o-terphenyl, m-terphenyl. These additives may be used alone or in combination of two or more.

The non-aqueous electrolyte may be a solid electrolyte containing a polymer material, or alternatively a gelled electrolyte further containing a non-aqueous solvent. Examples of the polymer material include polyethylene oxide, polypropylene oxide, polyphosphazene, polyaziridine, polyethylene sulfide, polyvinyl alcohol, polyvinylidene fluoride, and polyhexafluoropropylene.

In the case of using a gelled non-aqueous electrolyte, the gelled non-aqueous electrolyte may be arranged between the positive electrode and the negative electrode in place of the separator. Alternatively, the gelled non-aqueous electrolyte may be arranged so as to be adjacent to the separator.

Further, the non-aqueous electrolyte may be a solid electrolyte containing an inorganic material such as a lithium nitride, a lithium halide, a lithium oxyacid salt, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, and a phosphorus sulfide compound.

The separator may be a non-woven fabric, a microporous film or the like containing at least one selected from the group consisting of polyethylene, polypropylene, a mixture of polyethylene and polypropylene, a copolymer of ethylene and propylene, aramid resin, amide-imide, polyphenylene sulfide, and polyimide. In the case of using a liquid non-aqueous electrolyte, the separator is impregnated with the liquid non-aqueous electrolyte.

The separator may include a heat-resistant filler such as alumina, magnesia, silica, and titania in the interior or on the surface thereof.

In addition to the separator, a heat-resistant layer including the foregoing heat-resistant filler and the binder as listed above as the binders for a positive electrode and a negative electrode may be formed. The heat-resistant layer may be formed on any of the positive electrode surface, the negative electrode surface, and the separator surface.

The battery case is made of, for example, a metal, and may be a battery case including iron, nickel, nickel-plated iron, copper, aluminum, an aluminum alloy or the like.

The present invention is most effective when applied to a lithium ion secondary battery having a high output power and a high energy density. The present invention, however, is applicable not only to the lithium ion secondary battery but also to other batteries with similar effect, such as an alkaline secondary battery, a dry battery, and a lithium primary battery.

The present invention is specifically described below with reference to examples. It should be noted, however, the present invention is not limited to these examples.

EXAMPLES

Example 1

(a) Production of Positive Electrode

Lithium cobaltate ($LiCoO_2$) having an average particle size of 10 μm was used as a positive electrode active material. First, 100 parts by weight of the positive electrode active material, 8 parts by weight of polyvinylidene fluoride (PVDF) serving as a binder, 3 parts by weight of acetylene black serving as a conductive agent, and an appropriate amount of N-methyl-2-pyrrolidone (NMP) were mixed together, thereby to prepare a positive electrode material mixture paste.

The positive electrode material mixture paste was applied on both surfaces of an aluminum foil of 600 mm in length, 54 mm in width, and 20 μm in thickness serving as a positive electrode current collector, except an area to be a positive electrode lead connecting portion, and then dried, whereby a positive electrode was produced. The thickness of the positive electrode active material layer formed on each surface of the positive electrode current collector was 70 μm. The positive electrode lead connecting portion (i.e., a positive electrode current collector exposed portion) was at an end of the positive electrode from which the winding of the electrode assembly starts.

One end of a positive electrode lead was welded to the positive electrode current collector exposed portion by ultrasonic welding. An aluminum lead of 50 mm in length, 3 mm in width, and 0.1 mm in thickness was used as the positive electrode lead.

(b) Production of Negative Electrode

Artificial graphite having an average particle size of 20 μm was used as a negative electrode active material. First, 100 parts by weight of the negative electrode active material, 1 part by weight of a styrene-butadiene copolymer (BM-400B available from Zeon Corporation, Japan) serving as a binder, 1 part by weight of carboxymethylcellulose serving as a thickener, and an appropriate amount of water were mixed together, thereby to prepare a negative electrode material mixture paste.

The negative electrode material mixture paste was applied on both surfaces of a copper foil of 630 mm in length, 56 mm in width, and 10 μm in thickness serving as a negative electrode current collector, except an area to be a negative electrode lead connecting portion, and then dried, whereby a negative electrode was produced. The thickness of the negative electrode active material layer formed on each surface of the negative electrode current collector was 65 μm. The negative electrode lead connecting portion (i.e., a negative electrode current collector exposed portion) was at an end of the negative electrode at which the winding of the electrode assembly completes.

One end of a negative electrode lead was welded to the negative electrode current collector exposed portion by ultrasonic welding. A copper lead of 50 mm in length, 3 mm in width, and 0.1 mm in thickness was used as the negative electrode lead.

(c) Preparation of Non-aqueous Electrolyte

To a mixed solvent containing ethylene carbonate and ethyl methyl carbonate in a volume ratio of 1:1, $LiPF_6$ serving as a solute was dissolved at a concentration of 1.0 mol/L, thereby to prepare a non-aqueous electrolyte.

(d) Formation of First Highly-resistive Layer

First, 900 g of alumina having an average particle size (median diameter by volume) of 0.3 μm, 1250 g of "BM-720H (trade name)" available from Zeon Corporation, Japan (an NMP solution containing 8 wt % modified polyacrylonitrile rubber), and an appropriate amount of NMP were stirred together in a double arm kneader, thereby to prepare a highly-resistive layer paste.

A cylindrical iron case having a bottom, a side wall, and an upper opening was used as a battery case. The highly-resistive layer paste was applied onto the inner surface of the opening-edge portion of the cylindrical battery case, and then dried at 120° C. in a reduced pressure under vacuum for 10 hours. In such a manner, a first highly-resistive layer having a width of 5 mm and a thickness of 20 μm was formed on the inner surface of the cylindrical battery case along the opening-edge portion.

(e) Fabrication of Battery

The positive electrode and the negative electrode were wound with a separator of a 20-μm-thick polyethylene microporous film (available from Asahi Kasei Corporation) interposed therebetween, whereby an electrode assembly was formed. In the electrode assembly, the positive electrode lead and the negative electrode lead were extended in opposite directions.

A valve member made of aluminum, a PTC element, and a terminal cap made of nickel (positive electrode terminal) were fixed by a filter made of aluminum with an inner insulating member made of polypropylene interposed therebetween, whereby a sealing plate was assembled.

The electrode assembly was sandwiched between an upper insulating plate and a lower insulating plate, and the whole was accommodated in the battery case. The other end of the positive electrode lead was connected to the bottom surface of the sealing plate by laser welding. The other end of the negative electrode lead was connected to the inner bottom surface of the battery case by resistance welding. A step for sealing was formed on the battery case at a position 5 mm below the opening-edge portion of the battery case. The upper insulating plate and the lower insulating plate were both made of polypropylene. Subsequently, the non-aqueous electrolyte was injected in an amount of 5 g into the battery case.

The opening-edge portion of the battery case was clamped onto the sealing plate with a gasket made of polypropylene interposed therebetween, to seal the opening-edge portion of the battery case. Here, for evaluation, the gasket was provided with a crack of 3 mm in length in an area to be in contact with the opening-edge portion of the battery case. In such a manner, a cylindrical lithium ion secondary battery being 18 mm in diameter and 65 mm in height and having a design capacity of 2600 mAh was fabricated.

Example 2

The highly-resistive layer paste was applied onto the convex surface of the step of the battery case, and then dried at 120° C. in a reduced pressure under vacuum for 10 hours. In such a manner, a third highly-resistive layer having a thickness of 20 μm was formed on the convex surface of the step of the cylindrical battery case.

A cylindrical lithium ion secondary battery was fabricated in the same manner as in Example 1 except that the foregoing battery case was used.

Example 3

The highly-resistive layer paste was applied onto the end of the opening-edge portion of the battery case, and then dried at 120° C. in a reduced pressure under vacuum for 10 hours. In such a manner, a fourth highly-resistive layer having a thickness of 20 μm was formed on the end of the opening-edge portion of the cylindrical battery case.

A cylindrical lithium ion secondary battery was fabricated in the same manner as in Example 1 except that the foregoing battery case was used.

Example 4

The highly-resistive layer paste was applied onto the opening-edge portion of the battery case, the end of the opening-edge portion of the battery case, and the convex surface of the step of the battery case, and then dried at 120° C. in a reduced pressure under vacuum for 10 hours. In such a manner, first, third and fourth highly-resistive layers having a thickness of 20 μm was formed on the inner surface of the cylindrical battery case.

A cylindrical lithium ion secondary battery was fabricated in the same manner as in Example 1 except that the foregoing battery case was used.

Example 5

No highly-resistive layer paste was applied onto the inner surface of the opening-edge portion of the battery case.

The highly-resistive layer paste was applied onto the outer periphery of the filter in the sealing plate, and then dried at 120° C. in a reduced pressure under vacuum for 10 hours, whereby a second highly-resistive layer was formed on the sealing plate. The thickness of the second highly-resistive layer was 20 µm.

A cylindrical lithium ion secondary battery not having a first highly-resistive layer and having a second highly-resistive layer was fabricated in the same manner as in Example 1 except the above.

Example 6

The highly-resistive layer paste was applied onto the outer periphery of the filter in the sealing plate, and then dried at 120° C. in a reduced pressure under vacuum for 10 hours, whereby a second highly-resistive layer was formed on the sealing plate. The thickness of the second highly-resistive layer was 20 µm.

A cylindrical lithium ion secondary battery having both a first highly-resistive layer and a second highly-resistive layer was fabricated in the same manner as in Example 1 except that the foregoing sealing plate was used.

Comparative Example 1

A cylindrical lithium ion secondary battery having no highly-resistive layer was fabricated in the same manner as in Example 1 except that the first highly-resistive layer was not formed between the opening-edge portion of the battery case and the gasket.

Example 7

A prismatic battery was fabricated in the following manner.

The same highly-resistive layer paste as used in Example 1 was applied onto a portion of the sealing plate facing the terminal member with the gasket interposed therebetween, and then dried at 120° C. in a reduced pressure under vacuum for 10 hours. In such a manner, a first highly-resistive layer was formed on the sealing plate. The thickness of the first highly-resistive layer was 20 µm.

A gasket made of PFA (tetrafluoroethylene-perfluoroalkyl vinylether copolymer) was attached to the sealing plate, and this was clamped by a terminal member.

The same positive electrode and negative electrode as used in Example 1 were wound with the same separator as used in Example 1 interposed therebetween, to form an electrode assembly having an appropriately elliptic cross section. The electrode assembly was accommodated in a prismatic battery case. The battery case was a case having a bottom, a side wall, and an upper opening, and having a substantially square shape. The thickness of the main flat portion of a side wall 20b was 300 µm.

Thereafter, an insulator for preventing a short circuit between the battery case and the positive or negative electrode lead was placed on top of the electrode assembly. Subsequently, the square sealing plate with the terminal member surrounded by the gasket inserted at the center thereof was placed at the opening of the battery case. The negative electrode lead was connected to the terminal member. The positive electrode lead was connected to the undersurface of the sealing plate. The opening-edge portion and the sealing plate were welded together by laser, sealing the upper opening of the battery case. Subsequently, the same non-aqueous electrolyte as used in Example 1 was injected in an amount of 2.5 g into the battery case through the electrolyte injection port in the sealing plate. Finally, the electrolyte injection port was sealed by the sealing stopper. In such a manner, a prismatic lithium ion secondary battery being 5.2 mm in thickness, 50 mm in height and 34 mm in width and having a design capacity of 900 mAh was fabricated.

Example 8

No highly-resistive layer paste was applied onto the sealing plate. The same highly-resistive layer paste as used in Example 1 was applied onto a portion of the terminal member facing the sealing plate with the gasket interposed therebetween. The paste was then dried at 120° C. in a reduced pressure under vacuum for 10 hours. In such a manner, a second highly-resistive layer was formed on the terminal member. The thickness of the second highly-resistive layer was 20 µm.

A prismatic lithium ion secondary battery not having a first highly-resistive layer and having a second highly-resistive layer was fabricated in the same manner as in Example 7 except the above.

Evaluation of Battery

Ten batteries were fabricated for each Example and Comparative Example and evaluated in the following manner.

Each battery was subjected to a free drop from the height of 1.9 m (maximum 10 times) at an environmental temperature of 25° C., to measure the number of times that the battery had been dropped until a short circuit occurred, which was defined as drop impact resistance. The occurrence of short circuit was verified by testing for continuity between the positive electrode cap and the battery case using a tester.

With regard to the batteries of Examples, no short circuit occurred in all ten batteries. With regard to the batteries of Comparative Examples, a short circuit occurred in five out of ten batteries.

The temperature of the battery immediately after the test was measured. The results showed that the temperatures of the batteries of Examples were all 30° C. or lower, whereas the temperatures of the batteries of Comparative Examples were all 60° C. or higher.

The foregoing results indicate that forming the first highly-resistive layer or the second highly-resistive layer can further improve the safety of the battery.

INDUSTRIAL APPLICABILITY

According to the present invention, it is possible to provide a battery having an improved safety. The battery of the present invention, therefore, is useful as a power source, particularly for portable electronic equipment, such as personal computers, cellular phones, mobile equipment, personal digital assistants (PDAs), portable game machines, and video cameras. Further, the battery of the present invention is expected to be applied as a secondary battery for providing power assist to an electric motor in hybrid electric vehicles, fuel cell vehicles, and the like; a power source for driving an electrically-powered tool, cleaner, robot, and the like; a power source for powering a plug-in HEV; and the like.

REFERENCE SIGNS LIST

1 First electrode
1a First current collector
1b First active material layer

2 Second electrode
2a Second current collector
2b Second active material layer
3 Separator
4 First electrode lead
5 Second electrode lead
6 Battery case
7 Sealing plate
8 Gasket
9 Valve member
9a Upper valve member
9b Lower valve member
10 PTC element
11 Terminal cap
12 Filter
13 Inner insulating member
14a First highly-resistive layer
14b Second highly-resistive layer
14c Third highly-resistive layer
14d Fourth highly-resistive layer
15a Upper insulating plate
15b Lower insulating plate
20 Battery case
21 Electrode assembly
22 First electrode lead
23 Second electrode lead
24 Insulator
25 Sealing plate
26 Gasket
27 Terminal member
28a First highly-resistive layer
28b Second highly-resistive layer
29 Sealing stopper
30 Inner insulating member
31 Connector plate
32 Valve member
33 Third highly-resistive layer

The invention claimed is:

1. A battery comprising: a battery case having a bottom, a side wall, and an upper opening; an electrode assembly; an electrolyte; and a sealing plate covering the upper opening of said battery case accommodating said electrode assembly and said electrolyte,
said electrode assembly including a positive electrode, a negative electrode, and a separator interposed between said positive electrode and said negative electrode, wherein
a gasket is interposed between an opening-edge portion of said battery case and said sealing plate,
a first resistive layer is disposed between said opening-edge portion of said battery case and said gasket, or a second resistive layer is disposed between said sealing plate and said gasket, and
said first resistive layer or said second resistive layer contains a mixture of a particulate inorganic oxide and a binder.

2. The battery in accordance with claim 1, wherein both said first resistive layer and said second resistive layer are provided.

3. The battery in accordance with claim 1, wherein said first resistive layer is disposed on an entire area where said opening-edge portion of said battery case and said gasket face to each other, or said second resistive layer is disposed on an entire area where said sealing plate and said gasket face to each other.

4. The battery in accordance with claim 1, wherein said battery case has a step depressed inwardly being formed between said opening-edge portion and said side wall facing the electrode assembly, and a third resistive layer is disposed on a convex surface of said step.

5. The battery in accordance with claim 1, wherein a fourth resistive layer is disposed on an end of said opening-edge portion of said battery case.

6. The battery in accordance with claim 1, wherein said first resistive layer or said second resistive layer has a thickness of 1 μm or more and 100 μm or less.

7. The battery in accordance with claim 1, wherein said binder contains at least one selected from the group consisting of epoxy resin, polyamide resin, polyolefin resin, polyimide resin, polyvinyl resin, silicone resin, and fluorocarbon resin.

8. The battery in accordance with claim 1, wherein said battery is a lithium ion secondary battery.

* * * * *